(12) United States Patent
Leonhardt et al.

(10) Patent No.: US 7,136,801 B2
(45) Date of Patent: *Nov. 14, 2006

(54) OUTBOARD DATA STORAGE MANAGEMENT SYSTEM AND METHOD

(75) Inventors: Michael L. Leonhardt, Longmont, CO (US); Stephen H. Blendermann, Boulder, CO (US); Alan R. Sutton, Boulder, CO (US); Charles A. Milligan, Golden, CO (US)

(73) Assignee: Storage Technology Corporation, Louisville, CO (US)

( * ) Notice: Subject to any disclaimer, the term of this patent is extended or adjusted under 35 U.S.C. 154(b) by 212 days.

This patent is subject to a terminal disclaimer.

(21) Appl. No.: 10/803,137

(22) Filed: Mar. 10, 2004

(65) Prior Publication Data

US 2004/0177228 A1    Sep. 9, 2004

Related U.S. Application Data

(63) Continuation of application No. 09/878,696, filed on Jun. 11, 2001, now abandoned.

(51) Int. Cl.
  G06F 9/455    (2006.01)
  G06F 12/00   (2006.01)
(52) U.S. Cl. .......................... 703/27; 711/100
(58) Field of Classification Search ............. None
  See application file for complete search history.

(56) References Cited

U.S. PATENT DOCUMENTS 4,467,421 A    8/1984    White
5,394,532 A    2/1995    Belsan
5,403,639 A    4/1995    Belsan et al.
6,049,848 A    4/2000    Yates et al.
6,052,765 A    4/2000    Blendermann et al.
6,067,587 A    5/2000    Miller et al.
6,094,605 A    7/2000    Blendermann et al.
6,151,666 A    11/2000   Blendermann et al.
RE36,989 E     12/2000   White
6,269,464 B1   7/2001    Boussina et al.
6,289,425 B1   9/2001    Blendermann et al.
6,317,814 B1   11/2001   Blendermann et al.
6,324,497 B1   11/2001   Yates et al.
6,330,621 B1   12/2001   Bakke et al.

FOREIGN PATENT DOCUMENTS

WO    WO 00 41510 A    7/2000
WO    WO 01 31431 A    5/2001

Primary Examiner—Gary Portka
(74) Attorney, Agent, or Firm—Brooks Kushman P.C.

(57) ABSTRACT

A data storage system for storing data for a host processor includes physical data storage devices each having data storage attributes and an outboard storage manager. The outboard storage manager is operable with the physical data storage devices for presenting to the host processor a virtual data storage image having a desired data storage attribute for a particular data storage application by organizing the physical data storage devices in an arrangement suitable for providing the desired data storage attribute irrespective of the data storage attributes of the physical data storage devices such that the combined physical data storage device arrangement emulates the virtual data storage image. The outboard storage manager is operable to transfer data between the host processor and the organized physical data storage device arrangement via the virtual data storage image.

41 Claims, 1 Drawing Sheet

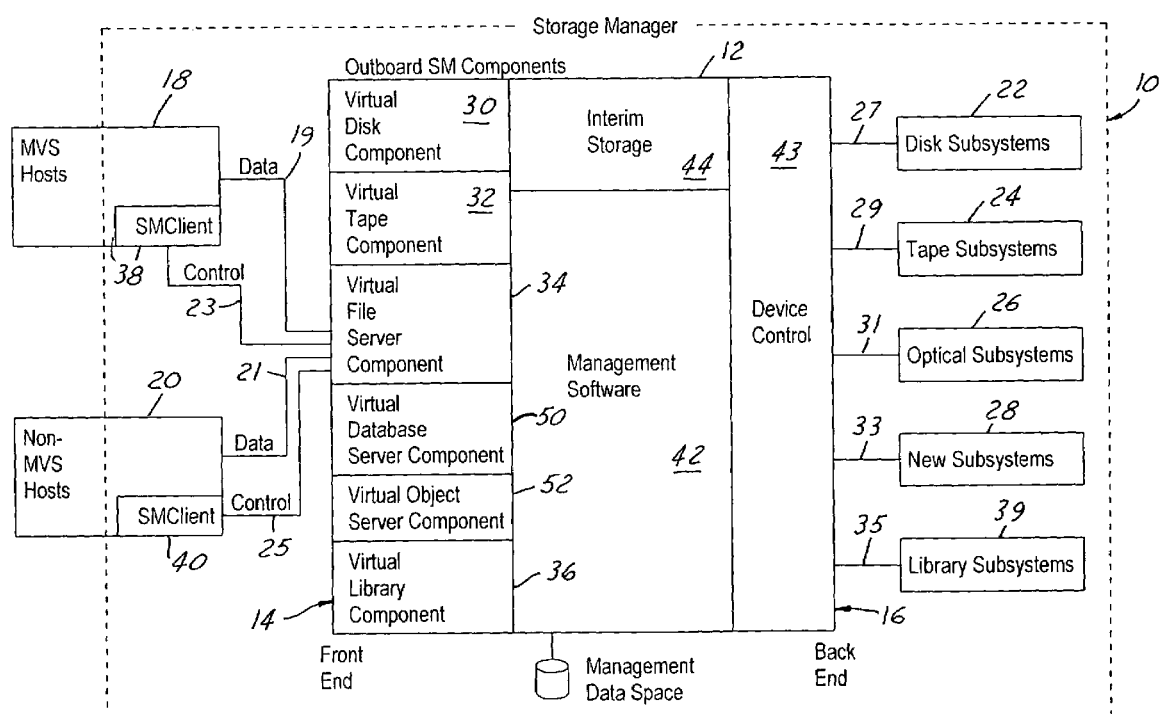

OUTBOARD DATA STORAGE MANAGEMENT SYSTEM AND METHOD

CROSS-REFERENCE TO RELATED APPLICATIONS

This is a continuation of application Ser. No. 09/878,696 filed on Jun. 11, 2001 now abandoned.

TECHNICAL FIELD

The present invention relates generally to data storage management systems and, more particularly, to an outboard data storage management system and method which present to host processors a virtual data storage image having a desired storage attribute for a particular data storage application by combining physical data storage devices in an arrangement suitable for providing the desired storage attribute.

BACKGROUND ART

Data storage subsystems include a plurality of different types of data storage devices for storing data for host processors. Each type of data storage device has different storage attributes that are suitable for storing data having certain data attributes. Data storage management systems route the data from the host processors to selected data storage devices. The data storage devices for storing the data are selected as a function of the data attributes. Typically, data storage management systems make available to the host processors the actual data storage devices which are to store the data. That is, the data is directly routed from the host processors to the selected data storage device.

A problem with this arrangement is that a selected data storage device may be unavailable at the time a host processor needs to access the selected data storage device or the data storage subsystem may not even have the selected data storage device. Another problem with this arrangement is that none of the data storage devices in the data storage subsystem may have the storage attributes suitable for storing the data.

SUMMARY OF THE INVENTION

Accordingly, it is an object of the present invention to provide an outboard data storage management system and method which present to host processors a virtual data storage image having a desired storage attribute for a particular data storage application by combining physical data storage devices in an arrangement suitable for providing the desired storage attribute. The virtual data storage image can be, for example, a device image (e.g., disk, tape, etc.) or a file system image (e.g., NFS, GFS, etc.), a database image, or an object based storage device image. The term "virtual data storage device" used herein refers to a device, file, database, and object.

It is another object of the present invention to provide an outboard data storage management system and method which present to host processors an image of a virtual disk component for storing data by combining physical data storage devices to emulate the virtual disk component as a function of attributes of the data.

It is a further object of the present invention to provide an outboard data storage management system and method which present to host processors an image of a virtual tape component for storing data by combining physical data storage devices to emulate the virtual tape component as a function of attributes of the data.

It is still another object of the present invention to provide an outboard storage management system and method which present to host processors an image of a virtual library component for storing data by combining physical data storage devices to emulate the virtual library component as a function of attributes of the data.

It is still a further object of the present invention to provide an outboard storage management system and method which present to host processors an image of a virtual server component by combining physical data storage devices to emulate the virtual server component as a function of attributes of the data.

It is still yet another object of the present invention to provide an outboard storage management system and method which present to host processors an image of a virtual database server component by combining physical data storage devices to emulate the virtual database server component as a function of attributes of the data.

It is still yet a further object of the present invention to provide an outboard storage management system and method which present to host processors an image of a virtual object server component as a function of attributes of the data.

In carrying out the above objects and other objects, the present invention provides a data storage system for storing data for a host processor. The data storage system includes a plurality of physical data storage devices each having data storage attributes. An outboard storage manager is operable with the plurality of physical data storage devices for presenting to the host processor a virtual data storage image having a desired data storage attribute for a particular data storage application by organizing the physical data storage devices in an arrangement suitable for providing the desired data storage attribute irrespective of the data storage attributes of the physical data storage devices such that the organized physical data storage device arrangement emulates the virtual data storage image. The outboard storage manager is operable to transfer data between the host processor and the organized physical data storage device arrangement via the virtual data storage image. The outboard storage manager organizes the physical data storage devices in the arrangement suitable for providing the desired data storage attributes as a function of attributes of the data for the particular data application.

The virtual data storage image presented by the outboard storage manager may be a virtual data storage device image, a virtual data storage file image, a virtual data storage database image, a virtual disk component, a virtual tape component, a virtual library component, a virtual server component, a virtual database component, or a virtual object component.

A storage manager client is resident on the host processor. The storage manager client is operable with the outboard storage manager for transferring information indicative of the desired data storage attribute and for transferring information indicative of the attributes of the data for the particular data application to the outboard storage manager.

The outboard storage manager may further include interim storage for storing data transferred between the host processor and the combined physical data storage device arrangement via the virtual data storage device. The outboard storage manager includes a front end and a back end. The front end is operable for presenting to the host processor the virtual data storage image having the desired data storage attribute for the particular data application. The back end is operable for organizing the physical storage devices in the suitable arrangement. The front end is connected by a data channel function and a control path function to the host processor for receiving the data and information indicative of the desired data storage attribute. The back end is connected to each of the plurality of physical data storage devices by respective data channels for transferring the received data to the organized physical data storage device arrangement providing the desired data storage attribute.

The outboard storage manager may further includes interim storage for storing data transferred between the host processor and the combined physical data storage device arrangement via the virtual data storage device. The outboard storage manager includes a front end and a back end. The front end is operable for presenting to the host processor the virtual data storage image having the desired data storage attribute for the particular data application. The back end is operable for organizing the physical storage devices in the suitable arrangement. The front end is connected by a data channel function and a control path function to the host processor for receiving the data and information indicative of the desired data storage attribute. The back end is connected to each of the plurality of physical data storage devices by respective data channels for transferring the received data to the organized physical data storage device arrangement providing the desired data storage attribute.

The plurality of physical data storage devices may include a disk subsystem, a tape subsystem, an optical subsystem, a solid state subsystem, and a probe storage subsystem.

The outboard storage manager may arrange the combined physical data storage device arrangement emulating the virtual data storage image in a storage hierarchy having several storage levels without knowledge by the host processor for the particular data application. The outboard storage manager may promote and demote storage levels in the storage hierarchy without knowledge by the host processor for the particular data application. The outboard storage manager may remove and restore storage levels in the storage hierarchy without knowledge by the host processor for the particular data application.

The outboard storage manager may transfer the data from the host processor directly to intermediate storage levels via the virtual data storage image without knowledge by the host processor for the particular data application. The outboard storage manager may transfer respective portions of the data from the host processor to respective storage levels via the virtual data storage image without knowledge by the host processor for the particular data application. The outboard storage manager may transfer data simultaneously to different storage levels via the virtual data storage image without knowledge by the host processor for the particular data application. The outboard storage manager may transfer data simultaneously from different storage levels to the virtual data storage image without knowledge by the host processor for the particular data application.

The outboard storage manager may arrange a physical data storage device in the combined physical data storage device arrangement in a storage hierarchy having several storage levels without knowledge by the host processor for the particular data application. The outboard storage manager may arrange a portion of a physical data storage device in the combined physical data storage device arrangement in a storage hierarchy having several storage levels without knowledge by the host processor for the particular data application.

Further, in carrying out the above objects and other objects, the present invention provides a data storage method for storing data for a host processor. The data storage method includes providing a plurality of physical data storage devices each having data storage attributes. A virtual data storage image having a desired data storage attribute for a particular data storage application is then presented to the host processor by organizing the physical data storage devices in an arrangement suitable for providing the desired data storage attribute irrespective of the data storage attributes of the physical data storage devices such that the organized physical data storage device arrangement emulates the virtual data storage image. Data is then transferred between the host processor and the organized physical data storage device arrangement via the virtual data storage image.

The above objects and other objects, features, and advantages of the present invention are readily apparent from the following detailed description of the best mode for carrying out the present invention when taken in connection with the accompanying drawings.

BRIEF DESCRIPTION OF THE DRAWINGS

The FIGURE illustrates a block diagram of an outboard storage manager in accordance with the outboard storage management system and method of the present invention.

BEST MODES FOR CARRYING OUT THE INVENTION

Data Storage Conventions

Data is user information which is to be stored or retrieved. The content or meaning of the user information is not known and the user information does not depend on physical storage device formatting attributes for content or meaning. A data path is an interface over which data is transferred. A data set or data file is an end user named and defined grouping of data. The names do not have to be unique across the host processors in the data storage subsystem. A volume is an identified collection of data sets.

A host or virtual volume is a uniquely identified collection of data sets. A host or virtual volume typically includes a single physical data storage device or a portion of a single physical data storage device. In this context, a physical volume includes a single physical data storage device which may contain a portion of a host volume, all of a host volume, or many host volumes stored thereon. A physical or real data storage device is the actual read/write data storage device which stores data on a physical volume.

Random access is a method of storing data on a data storage device that permits the user to access any of the data sets stored on the data storage device in any order that the user desires. The user is typically unaware of the sequences which provide access to the desired data set. Sequential access is a method of storing data on a data storage device in a predetermined sequential order such that the user can access a desired data set only if all the sequentially prior data sets on the sequentially written data storage device have been accessed.

Outboard Storage Manager High Level Architecture

Referring now to the FIGURE, a block diagram of an outboard storage manager 10 in accordance with the outboard storage management system and method of the present invention is shown. Generally, outboard storage manager 10 is an outboard channel subsystem with front end data storage device virtualization, management of data per user specified data storage rules, back end data path management, and physical data storage.

Outboard storage manager 10 includes a storage manager component portion 12 having a front end 14 and a back end 16. Front end 14 generally refers to the virtual device side of storage manager component portion 12. Back end 16 generally refers to the physical device side of storage manager component portion 12. Host processors 18 and 20 of a host processor complex are individually connected to front end 14 of storage manager component portion 12. As an example, host processor 18 is a multiple virtual storage (MVS) host processor and host processor 20 is a non-MVS host processor.

Each of host processors 18 and 20 is connected by a respective data channel 19 and 21 and a respective control path 23 and 25 to front end 14 of storage manager component portion 12. Data channels 19 and 21 are interfaces over which data is communicated between host processors 18 and 20 and outboard storage manager 10. The data interface types include FIPS, ESCON, SCSI, etc. Control paths 23 and 25 are interfaces over which control information is communicated between host processors 18, 20 and outboard storage manager 10.

Storage manager component portion 12 is connected to host processors 18 and 20 to provide data storage capacity for host processor data on a plurality of physical data storage subsystems 22, 24, 26, 28, and 39. Data storage subsystems 22, 24, 26, 28, and 39 are individually connected to a data storage device controller 43 located in back end 16 of storage manager component portion 12 by respective back end data paths 27, 29, 31, 33, and 35. Data storage subsystems 22, 24, 26, 28, and 39 are generally comprised of physical data storage devices. As an example, the data storage subsystems include disk data storage subsystems 22 having a plurality of disk storage devices, tape data storage subsystems 24 having a plurality of tape storage devices, optical data storage subsystems 26 having a plurality of optical storage devices, new data storage subsystems 28 such as probe storage subsystems and solid state storage subsystems, and library subsystems 39 operable for managing removable media for each of the other data storage subsystems.

Outboard storage manager 10 appears to host processors 18 and 20 as either an attached physical data storage device or a data file repository. Outboard storage manager 10 is generally a system of cooperatively executing processes located in a processing system that interconnects host processor data channels 19 and 21 and the physical data storage devices 22, 24, 26, 28, and 39. From the view of host processors 18 and 20 outboard storage manager 10 represents a plurality of physical data storage devices. From the view of data storage devices 22, 24, 26, 28, and 39, outboard storage manager 10 represents an associated data storage device controller, i.e., device controller 43.

Outboard storage manager 10 accomplishes this by providing front end data storage device virtualization in which a virtual data storage device 30, 32, 34, 36, 50, and 52 representing one or more different physical data storage devices and/or a file server are presented at front end 14 to host processors 18 and 20. As an example, virtual data storage devices 30, 32, 34, 36, 50, and 52 include a virtual disk component (VDC) 30, a virtual tape component (VTC) 32, a virtual file server component 34, a virtual library component (VLC) 36, a virtual database server component 50, and a virtual object server component 52. Virtual data storage devices 30, 32, and 36 provide physical data storage device emulation and also provide for new representations of physical data storage devices that have yet to be designed or sold. For instance, virtual data storage devices 30, 32, and 36 each appear to host processors 18 and 20 as a separate entity, but each virtual data storage device is actually a shared portion of a physical data storage device(s) 22, 24, 26, 28, and 39.

In addition, outboard storage manager 10 manages the received user data based on user provided data storage rules, data attributes, and data policies. Outboard storage manager 10 further manages the physical data storage capacity of physical data storage devices 22, 24, 26, 28, and 39 and back end data paths 27, 29, 31, 33, and 35 that interconnect the physical data storage devices with storage manager component portion 12.

Outboard storage manager 10 further includes storage manager clients 38 and 40 resident on respective host processors 18 and 20. Storage manager clients 38 and 40 are software products which function to direct data sets to an appropriate one of the virtual data storage device components 30, 32, or 36, virtual file server component 34, virtual database server component 50, or virtual object server component 52. Storage manager clients 38 and 40 communicate data storage rules from respective host processors 18 and 20 to storage manager component portion 12 via respective control paths 23 and 25. The data storage rules specify in high level terms how the accompanying data sets are to be stored by storage manager 10. Management software 42 residing in storage manage component portion 12 uses the data storage rules to determine how the received data sets transferred via data channels 19 and 21 are to be treated. The data storage rules contain information such as what data transfer and data access characteristics are needed by the user and when these defined characteristics can be relaxed to reduce the impact on expensive effected data storage devices 22, 24, 26, 28, and 39 served by storage manager 10. If data storage rules do not exist, as in the case of most non-MVS host processors, then outboard storage manager 10 provides a single point of control for the user to specify the data storage rules.

In response to the data storage rules and data policies and attributes, outboard storage manager 10 controls the selection of data storage devices 22, 24, 26, 28, and 39 and data paths 27, 29, 31, 33, and 35 used for the storage of each data set received from host processors 18 and 20 to maximize data throughput and storage media utilization. The user and host processors 18 and 20 are unaware of the selected data storage device on which the data sets are stored.

Data Set Creation

When a host processor 18 or 20 needs to create a data set and the data storage rules indicate that this data set should reside on managed resources of outboard storage manager 10 storage manager clients 38 and 40 initiate the data set transfer by causing the host processor operating system to select a physical data storage device and transfer any control information (i.e., data storage rules) via control paths 23 and 25 to storage manager component portion 12. Host processor 18 or 20 then transfers the identified data set to the virtual data storage device 30, 32, or 36 that corresponds to the selected physical data storage device. The transfer appears to host processors 18 or 20 as if it were occurring to the selected data storage device. The data set in reality is transmitted by host processors 18 or 20 over a respective data channel 19 or 21 to storage manager component portion 12 which receives the data set via emulating the selected physical data storage device and stores the received data set in interim storage (cache) 44 of storage management component portion 12. Interim storage 44 is data storage space which is used as a temporary storage area when either the initial data management rules cannot be satisfied or when speed matching or masking of data transfers is needed. Interim memory 44 may include solid state memory, DASD, or other suitable memory technologies. Interim memory 44 may be dedicated memory located within storage manager component portion 12 or shared space on one of the back end physical data storage devices.

Storage manager management software 42 determines which physical data storage device(s) 22, 24, 26, 28, and 39 and physical volume(s) on the selected physical data storage device(s) the data set is written to. Storage management data space 46 of outboard storage manager 10 catalogs the correlation between the host volume and the physical volume(s).

If the interface command protocol specifies that the data write must be verified as successful before the data set transfer can complete, interim storage 44 must be of sufficient reliability to immediately verify the write when the data set is stored in the interim storage, or the verification must await the destaging of the received data set from the interim storage to a selected back end physical data storage device 22, 24, 26, 28, or 39. The writing of the received data set on to a back end physical storage device 22, 24, 26, 28, or 39 may be dependent on the mounting of the selected physical media on the selected physical storage device via library subsystem 39.

Data Set Retrieval

When a data set stored by outboard storage manager 10 must be retrieved for access by one of host processors 18 or 20, the host operating system in conjunction with storage manager clients 38 or 40 initiates a data set access based on unique volume or data set identification information. Storage manager management software 42 uses the host processor provided identification information to retrieve the corresponding physical volume data from storage manager management data space 46. Storage manager management software 42 also causes the identified physical volume to be mounted on a selected physical device to thereby enable the data stored on the physical volume to be accessed by host processors 18 and 20. Outboard storage manager 10 can initiate a data transfer from the mounted physical volume to interim storage 44 while concurrently transmitting control information to the requesting host processor 18 or 20 via the control path 23 or 25 that the requested volume is available. Host processor 18 or 20 begins the data set transfer from the virtual data storage device 30, 32, or 36 by transmitting control information to the virtual data storage device over control paths 23 or 25. Outboard storage manager 10 transfers the staged data set from interim storage 44 to the requesting host processor 18 or 20 via the selected virtual data storage device interface 30, 32, or 36 using the specified front end device format. If host processor 18 or 20 requests the data set before it is staged into interim storage 44, outboard storage manager 10 causes the host processor to wait until the data set is available from the physical data storage devices 22, 24, 26, 28, and 39 storing the requested data set.

Outboard Storage Manager Functions

As described above, outboard storage manager 10 generally presents images of a virtual data storage device 30, 32, and 36 to host processors 18 and 20, but in reality, the physical data storage devices 22, 24, 26, 28, and 39 implemented to effect the virtual data storage device may be completely different physical data storage devices than the effected virtual data storage device. The physical storage devices 22, 24, 26, 28, and 39 may even be a different class of storage (tape, disk, optical, etc.) than the class of storage of the virtual data storage device 30, 32, and 36. Combinations of portions of the physical data storage devices 22, 24, 26, 28, and 39 may also be used to effect the virtual data storage devices 30, 32, and 36. Outboard storage manager 10 generally combines selected physical data storage devices in an arrangement suitable for emulating a virtual data storage device having certain data storage attributes. Outboard storage manager 10 combines the selected physical data storage devices as a function of data storage policies for a particular data storage application or as set by a user.

Data Management Rules

The capability of outboard storage manager 10 to store incoming data, migrate the data between different types of data storage devices 22, 24, 26, 28, and 39, and deliver the data back to a host processor 18 or 20 depends on information which normally does not come down the I/O data interface as the data is written. The attributes or storage policies of the individual data sets must be understood by outboard storage manager 10 in order to make intelligent decisions about placement and movement of the data sets. Some relevant data set attributes and policies are: data set size, the time interval between data set creation and next sequential access, level of performance expected by the applications which use the data set, acceptable data retrieval delay, change in data set performance over time, backup status of the data set, and number of active backup copies of the data set. Some of these data attributes and policies are categorized into data class, storage class, storage group, and management class. The host processor resident operating system permits the user to assign one of these attributes and policies to a data set when the data set is initially created.

Outboard storage manager 10 decides where the data set resides when it is initially created. The user can initially designate data set attributes and policies for a selected virtual data storage device 30, 32, and 36 to write data to and the virtual volume for storing the data, but outboard storage manager 10 automatically assigns a physical data storage device 22, 24, 26, 28, and 39 or combination thereof and physical volume(s) based on the user identified attributes and data storage rules.

The transmission of the data set attributes can be accomplished by the use of control paths 23 and 25 that interconnect storage manager clients 38 and 40 of host processors 18 and 20 with front end 14 of outboard storage manager component portion 12. This out of band control signaling is associated by outboard storage manager 10 with a data set stream transmitted via data paths 19 and 21 that interconnect host processors 18 and 20 with front end 14 of outboard storage manager component portion 12. The received data set is temporarily stored in interim storage 44 and the control information is used to select a physical device and physical volume for the destaging of the received data set from the interim storage to the selected storage location. Alternatively, storage manager clients 38 and 40 can create a preamble that contains this attribute information and prepend this preamble to the data set for in band transmission to outboard storage manager component portion 12 via data paths 19 and 21. Regardless of the choice of techniques to prime outboard storage manager 10 with data set attributes the host software in question is responsible for obtaining the definition of those attributes and sending them to the outboard storage manager at the right time.

Outboard storage manager 10 decides when and where data is to be migrated. Many data sets have initial performance requirements which are much higher than the performance required when the data sets are a few days old. Additionally, some data sets have rather sporadic time periods of reference and reside on lower performing less expensive data storage devices during periods of infrequent use. Outboard storage manager 10 automatically performs these functions based on the data set attributes.

Outboard storage manager 10 performs space reclamation when data sets are to be deleted. The data set attributes define when a data set is no longer needed, but the storage space used by that data set needs to be made available for new data. The action of reclaiming the storage space cannot occur until it is certain that the data set in question has been deleted by host processors 18 or 20. When that determination has been made outboard storage manager 10 will control the space reclamation process by itself.

Server Components

In addition to providing data storage and access capabilities via virtual data storage devices 30, 32, and 36, outboard storage manager 10 implements a native mode file system (i.e., virtual file server component 34) which can be concurrently shared by host processors 18 and 20. The data storage and retrieval access to this file system is accomplished through storage manager clients 38 and 40 resident on host processors 18 and 20, which translate logical data set requests received from application programs also resident on the host processors into the appropriate command sequences and dialogs with services contained in outboard storage manager 10. The application programs are unaware of the actual physical storage devices which are used to implement virtual file server component 34 and data set access can be either sequential or random. Similarly, outboard storage manager 10 also implements a virtual database server component 50 and a virtual object server component 52 which can be concurrently shared by host processors 18 and 20.

Device Virtualization

Virtual tape component (VTC) 32 of outboard storage manager 10 component portion 12 presents to host processors 18 and 20 the virtual image of a set of zero or more tape storage subsystems. With respect to the command set, statuses, and other programming interfaces from the point of view of host processors 18 and 20 each of the virtual tape storage subsystems has the full capabilities of a corresponding actual tape storage subsystem. For example, a host processor restricting itself to the documented actual tape storage subsystem would be unable to distinguish the virtual tape storage subsystem presented by VTC 32 from the actual tape storage subsystem. Actual tape storage devices emulated by VTC 32 include Storage Technology Corporation and IBM tape storage device models 3490 and 3490E. All of the features available on the actual tape storage devices that are being emulated by VTC 32 are available on the VTC. The emulated devices can be arbitrarily arranged to give the appearance of an actual tape storage subsystem.

Virtual disk component (VDC) 30 of outboard storage manager component portion 12 presents to host processors 18 and 20 the virtual image of a set of zero or more direct access storage device (DASD) subsystems. The extent of the virtualization is the same as that previously stated for virtual tape storage subsystems. Actual DASD subsystems emulated by VDC 30 include Storage Technology Corporation models 3380, 3390, and RAMAC and IBM DASD model 3990. All of the features available on the actual DASD subsystem will be available on the emulated device, i.e., VDC 30. The emulated devices can be arbitrarily grouped to give the appearance of an actual DASD subsystem.

Virtual library component (VLC) 36 of outboard storage manager component portion 12 presents to host processors 18 and 20 the virtual image of a set of zero or more tape storage libraries. Actual tape storage libraries emulated by VLC 36 include Storage Technology Corporation models 3494 and 3495. In general, the virtualized devices can be configured in any configuration that would be valid for the read devices that are being emulated.

Physical Data Storage Device Support

Physical data storage devices which can be supported by back end 16 of outboard storage manager component portion 12 include Storage Technology Corporation data storage device models Timberline, Iceberg, 4430 LMU, 9330/15 LMU, Nordique, 4480 and 4490, RedWood, SnoCap, and commodity SCSI tape and disk drives and IBM models 3490, 3390, and NTL. Data storage devices are attached to back end 16 by data channels 27, 29, 31, 33, and 35 which support ESCON, SCSI, FIPS, and fiberchannel data communications.

Management Software

Management software 42 performs data flow management for outboard storage manager 10. Data flow management refers to the set of processes which deal with: the management of interim storage 44 for virtual data storage devices 30, 32, and 36 and virtual file system objects 34; the scheduling and control of data transfers between interim storage 44 and physical data storage devices 22, 24, 26, 28, and 39 (i.e., stage and destage operations); the scheduling and control of data migration through the physical data storage device hierarchy; the application of techniques such as data striping to achieve the appropriate level of performance for a given data set; the management of data channels 27, 29, 31, 33, and 35 and control paths between storage manager component portion 12 and physical data storage devices 22, 24, 26, 28, and 39; the association of virtual data storage devices to the corresponding physical data storage devices; and overall workload management.

Management software 42 further controls physical volume management. When outboard storage manager 10 decides to move a data set from interim storage 44 to a back end physical storage device(s) 22, 24, 26, 28, and 39 then some decisions need to be made as to where to put them. If the data attributes as defined by storage management policy indicates that the data set is a candidate to reside on a tape cartridge, then a tape cartridge with expired data on it must be selected to write the data set to. The tape cartridge selected can be one which is completely void of data sets, or the tape cartridge could contain some data sets which have not yet expired and the space available on that tape cartridge can be used to write the current data.

Management software 42 further performs virtual volume management. When a host system creates a new data set the serial number of the data set is remembered by the host system that created the data set. The combination of the data set name and the volume serial number is the identifier that is used in the future when the data set is read. In the environment of outboard storage manager 10, the volume represented by this serial number is an illusion to host processors 18 and 20, but the outboard storage manager must remember what that host known serial number is when the data set is created so that it can respond to subsequent requests to read that data set as if the data set resides on that volume. In addition to the serial number of the volume that the host processor believed the data set was created on, outboard storage manager 10 must keep the position of the data set relative to the beginning of that volume. When the host processor reads the data set, positioning commands are issued to the virtual device to move to the place on the volume where the host processor thinks the data set was created. The outboard storage manager virtual device front end 14 will accept and portray the illusion that these commands are executed.

Management software 42 further performs data expiration processing. It is typical for data sets to have an inherent expiration date which defines a point in time at which the data contained in the data set is no longer valid. When data sets reach their expiration data and have been deleted by the user the memory space that these data sets occupy should be reclaimed so that media usage is as high as possible. On sequential media, such as magnetic tape, partial reclamation of space for a given piece of media demands that all space from the data set to the end of the tape be reclaimed. If this segment of tape contains valid data sets a judgement must be made regarding the cost to relocate these valid data sets to another media element so that this segment of tape can be reclaimed. Thus, it is beneficial to initially write data sets having the same expiration date on the same media element so that the entirety of the media element can be reclaimed at once. If the expiration date of a data set changed during management of the data set it should be relocated to a media element that contains other data sets having the same or temporally near expiration date. In addition, users typically group media elements into subsets termed tape pools and the media management of outboard storage manager 10 should accommodate this organization, at least on a virtual level.

Management software 42 further performs virtual volume management. When a host system creates a new data set the serial number of the is remembered by the host system that created the data set. The combination of the data set name and the volume serial number is the identifier that is used in the future when the data set is read. In the environment of outboard storage manager 10, the volume represented by this serial number is an illusion to host processors 18 and 20, but the outboard storage manager must remember what that host known serial number is when the data set is created so that it can respond to subsequent requests to read that data set as if the data set resides on that volume. In addition to the serial number of the volume that the host processor believed the data set was created on, outboard storage manager 10 must keep the position of the data set relative to the beginning of that volume. When the host processor reads the data set, positioning commands are issued to the virtual device to move to the place on the volume where the host processor thinks the data set was created. The outboard storage manager virtual device front end 14 will accept and portray the illusion that these commands are executed.

Physical Data Storage Device Arrangements

As described above, outboard storage manager 10 generally presents images of a virtual data storage device 30, 32, and 36 to host processors 18 and 20, but in reality, the physical data storage devices 22, 24, 26, 28, and 39 implemented to effect the virtual data storage device may be completely different physical data storage devices than the effected virtual data storage device. Outboard storage manager 10 is further operable to perform a variety of functions with respect to physical data storage devices 22, 24, 26, 28, and 39 for emulating virtual data storage devices 30, 32, and 36.

First, outboard storage manager 10 arranges physical data storage devices 22, 24, 26, 28, and 39 in a hierarchical fashion with multiple storage levels for a particular data application. The existence and the management of these storage levels is performed solely by outboard storage manager 10 without the knowledge of host processors 18 and 20. The multiple storage levels includes several intermediate storage levels between a fast and expensive random access top storage level and a removable inexpensive sequential access bottom storage level.

Second, outboard storage manager 10 can logically demount (e.g., remove and restore) individual storage levels of the storage level organization for a particular data application without affecting host processors 18 and 20.

Third, outboard storage manager 10 can promote and demote a particular storage level in the storage level organization without affecting host processors 18 and 20.

Fourth, outboard storage manager 10 can transfer data sets directly between host processors 18 and 20 to the lowest or intermediate storage levels without requiring the data sets be staged through higher storage levels for a particular data application. That is, outboard storage manager 10 can establish a virtual storage hierarchy for each data set transfer.

Fifth, outboard storage manager 10 can split data set residency between storage levels with some data set portion (e.g., an index, the first n bytes, etc.) resident on faster more expensive higher storage level such as DASD and the remaining data set bulk on a removable media lower storage level such as tape for a particular data application. That is, outboard storage manager 10 can split the data comprising a data set between different storage levels without knowledge by host processors 18 and 20.

Sixth, outboard storage manager 10 can simultaneously transfer data sets during writes to more than one storage level in accordance with attributes of the data sets for a particular data application. The data sets can be forked so that it goes to several storage levels at once or split so that some of the data set is transferred to one storage level and the remaining data set is transferred to another storage level.

Seventh, similarly outboard storage manager 10 can simultaneously transfer data sets during reads to host processors 18 and 20 for a particular data application by joining the data sets from the different storage levels for transfer to the host processors.

Eighth, outboard storage manager 10 may use the storage on one data storage device as more than one storage level for a particular data application. Ninth, the outboard storage manager may use the media of a single level as more than one level for a particular data application.

Thus it is apparent that there has been provided, in accordance with the present invention, an outboard data storage management system and method which present to host processors a virtual data storage device having a desired storage attribute for a particular data storage application by combining data storage devices in an arrangement suitable for providing the desired storage attribute that fully satisfies the objects, aims, and advantages set forth above. While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A data storage system for storing and retrieving data for a host processor, the data storage system comprising:

a plurality of different types of physical data storage devices, each physical data storage device having data storage attributes, the data storage attributes of the physical data storage devices differing from one another based on the types of the physical data storage devices; and an outboard storage manager operable with the plurality of physical data storage devices for presenting to a host processor a virtual data storage image having a desired data storage attribute for a particular data storage application by combining different types of at least some of the physical data storage devices, based on the data storage attributes of the physical data storage devices, in an arrangement suitable for providing the desired data storage attribute such that the combined physical data storage device arrangement emulates the virtual data storage image, wherein each physical data storage device individually lacks the desired data storage attribute, the outboard storage manager includes interim storage, wherein the outboard storage manager stores in the interim storage data received from the host processor via the virtual data storage image and then transfers the data from the interim storage to the physical data storage devices of the combined physical data storage device arrangement, wherein the outboard storage manager stores in the interim storage data received from the physical data storage devices of the combined physical data storage device arrangement and then transfers the data from the interim storage to the host processor via the virtual data storage image.

2. The data storage system of claim 1 wherein:
the virtual data storage image is a virtual data storage device image.

3. The data storage system of claim 1 wherein:
the virtual data storage image is a virtual data storage file image.

4. The data storage system of claim 1 wherein:
the virtual data storage image is a virtual data storage database image.

5. The data storage system of claim 1 wherein:
the virtual data storage image presented by the outboard storage manager is a virtual disk component.

6. The data storage system of claim 1 wherein:
the virtual data storage image presented by the outboard storage manger is a virtual tape component.

7. The data storage system of claim 1 wherein:
the virtual data storage image presented by the outboard storage manager is a virtual library component.

8. The data storage system of claim 1 wherein:
the virtual data storage image presented by the outboard storage manager is a virtual server component.

9. The data storage system of claim 1 wherein:
the virtual data storage image presented by the outboard storage manager is a virtual database component.

10. The data storage system of claim 1 wherein:
the virtual data storage image presented by the outboard storage manager is a virtual object component.

11. The data storage system of claim 1 wherein:
the outboard storage manager combines the at least some of the physical data storage devices in the arrangement suitable for providing the desired data storage attribute as a function of attributes of the data for the particular data application.

12. The data storage system of claim 1 further comprising:
a storage manager client resident on the host processor, wherein the storage manager client is operable with the outboard storage manager for transferring information indicative of the desired data storage attribute for the particular data application to the outboard storage manager.

13. The data storage system of claim 11 further comprising:
a storage manager client resident on the host processor, wherein the storage manager client is operable with the outboard storage manager for transferring information indicative of the attributes of the data for the particular data application to the outboard storage manager.

14. The data storage system of claim 1 wherein:
the outboard storage manager includes a front end and a back end, front end operable for presenting to the host processor the virtual data storage image having the desired data storage attribute for the particular data application, the back end operable for combining the at least some of the physical storage devices in the suitable arrangement, wherein the front end is connected by a data channel function and a control path function to the host processor for receiving the data and information indicative of the desired data storage attribute, wherein the back end is connected to each of the plurality of physical data storage devices by respective data channels for transferring the received data to the physical data storage devices of the combined physical data storage device arrangement providing the desired data storage attribute.

15. The data storage system of claim 14 wherein:
the data channel function and the control path function connect to the front end by using a single communication line.

16. The data storage system of claim 14 wherein:
the data channel function and the control path function connect to the front end using respective communication lines.

17. The data storage system of claim 1 wherein:
the plurality of physical data storage devices includes a disk subsystem.

18. The data storage system of claim 1 wherein:
the plurality of physical data storage devices includes a tape subsystem.

19. The data storage system of claim 1 wherein:
the plurality of physical data storage devices includes an optical subsystem.

20. The data storage system of claim 1 wherein:
the plurality of physical data storage devices includes a solid state subsystem.

21. The data storage system of claim 1 wherein:
the plurality of physical data storage devices includes a probe storage subsystem.

22. The data storage system of claim 1 wherein:
the outboard storage manager arranges the physical data storage devices of the combined physical data storage device arrangement emulating the virtual data storage image in a storage hierarchy having several storage levels without knowledge by the host processor for the particular data application.

23. The data storage system of claim 22 wherein:
the outboard storage manager promotes and demotes storage levels in the storage hierarchy without knowledge by the host processor for the particular data application.

24. The data storage system of claim 22 wherein:
the outboard storage manager removes and restores storage levels in the storage hierarchy without knowledge by the host processor for the particular data application.

25. The data storage system of claim 22 wherein:
the outboard storage manager transfers the data from the host processor directly to intermediate storage levels via the virtual data storage image and the interim storage without knowledge by the host processor for the particular data application.

26. The data storage system of claim 22 wherein:
the outboard storage manager transfers respective portions of the data from the host processor to respective storage levels via the virtual data storage image and the interim storage without knowledge by the host processor for the particular data application.

27. The data storage system of claim 22 wherein:
the outboard storage manager transfers data simultaneously to different storage levels via the virtual data storage image and the interim storage without knowledge by the host processor for the particular data application.

28. The data storage system of claim 22 wherein:
the outboard storage manager transfers data simultaneously from different storage levels to the virtual data storage image and the interim storage without knowledge by the host processor for the particular data application.

29. The data storage system of claim 22 wherein:
the outboard storage manager arranges a physical data storage device in the combined physical data storage device arrangement in a storage hierarchy having several storage levels without knowledge by the host processor for the particular data application.

30. The data storage system of claim 22 wherein:
the outboard storage manager arranges a portion of a physical data storage device in the combined physical data storage device arrangement in a storage hierarchy having several storage levels without knowledge by the host processor for the particular data application.

31. A data storage system for storing and retrieving data for a host processor, the data storage system comprising:
a plurality of different types of physical data storage devices including a disk subsystem and a tape subsystem, each physical data storage device having data storage attributes, the data storage attributes of the physical data storage devices differing from one another based on the types of the physical data storage devices; and
an outboard storage manager operable with the plurality of physical data storage devices for presenting to a host processor a virtual data storage image having a desired data storage attribute for a particular data storage application by organizing combining different types of at least some of the physical data storage devices, based on the data storage attributes of the physical data storage devices, in an arrangement suitable for providing the desired data storage attribute such that the combined physical data storage device arrangement emulates the virtual data storage image, wherein each physical data storage device individually lacks the desired data storage attribute, the outboard storage manager includes interim storage, wherein the outboard storage manager stores in the interim storage data received from the host processor via the virtual data storage image and then transfers the data from the interim storage to the physical data storage devices of the combined physical data storage device arrangement, wherein the outboard storage manager stores in the interim storage data received from the physical data storage devices of the combined physical data storage device arrangement and then transfers the data from the interim storage to the host processor via the virtual data storage image.

32. A data storage method for storing and retrieving data for a host processor, the data storage method comprising:
providing a plurality of different types of physical data storage devices each having data storage attributes such that the data storage attributes differ from one another based on the types of the physical data storage devices;
presenting to a host processor a virtual data storage image having a desired data storage attribute for a particular data storage application by organizing different types of at least some of the physical data storage devices based on the data storage attributes of the physical data storage devices in an arrangement suitable for providing the desired data storage attribute such that the organized physical data storage device arrangement emulates the virtual data storage image, wherein each physical data storage device individually lacks the desired data storage attribute;
storing, in interim storage, data received from the host processor via the virtual data storage image and then transferring the data from the interim storage to the physical data storage devices of the organized physical data storage device arrangement; and
storing, in the interim storage, data received from the physical data storage devices of the organized physical data storage device arrangement and then transferring the data from the interim storage to the host processor via the virtual data storage image.

33. The data storage method of claim 32 wherein:
organizing the at least some of the physical data storage devices in the organized physical data storage device arrangement includes organizing the at least some of the physical data storage devices as a function of attributes of the data for the particular data application.

34. The data storage method of claim 32 wherein:
organizing the at least some of the physical data storage devices in the organized physical data storage device arrangement includes organizing the at least some of the physical data storage devices in a storage hierarchy having several storage levels without knowledge by the host processor for the particular data application.

35. The data storage method of claim 34 wherein:
organizing the at least some of the physical storage devices in the organized physical data storage device arrangement includes promoting and demoting storage levels in the storage hierarchy without knowledge by the host processor for the particular data application.

36. The data storage method of claim 34 wherein:
organizing the at least some of the physical storage devices in the organized physical storage device arrangement includes removing and restoring storage levels in the storage hierarchy without knowledge by the host processor for the particular data application.

37. The data storage method of claim 34 wherein:
transferring data received from the host processor includes transferring the data from the host processor directly to intermediate storage levels via the virtual data storage image and the interim storage without knowledge by the host processor for the particular data application.

38. The data storage method of claim 34 wherein:
transferring data received from the host processor includes transferring respective portions of the data from the host processor to respective storage levels via the virtual data storage image and the interim storage without knowledge by the host processor for the particular data application.

39. The data storage method of claim 34 wherein:
transferring data received from the host processor includes transferring the data simultaneously to different storage levels via the virtual data storage image and the interim storage without knowledge by the host processor for the particular data application.

40. The data storage method of claim 34 wherein:
transferring data from the physical data storage device arrangement includes transferring the data simultaneously from different storage levels to the virtual data storage image and the interim storage without knowledge by the host processor for the particular data application.

41. The data storage method of claim 32 wherein:
organizing the at least some of the physical data storage devices in the organized physical data storage arrangement includes arranging a physical data storage device in the organized physical data storage device arrangement in a storage hierarchy having several storage levels without knowledge by the host processor for the particular data application.

* * * * *